US010087298B2

(12) United States Patent
Chuang et al.

(10) Patent No.: US 10,087,298 B2
(45) Date of Patent: Oct. 2, 2018

(54) BIO-POLYOL COMPOSITION AND BIO-POLYURETHANE FOAM MATERIAL

(71) Applicant: Industrial Technology Research Institute, Hsinchu (TW)

(72) Inventors: Wen-Pin Chuang, Hsinchu (TW); Yuung-Ching Sheen, Hsinchu County (TW); Yun-Ya Huang, Hsinchu (TW); Yi-Che Su, Hsinchu County (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 278 days.

(21) Appl. No.: 14/583,567

(22) Filed: Dec. 26, 2014

(65) Prior Publication Data

US 2015/0183948 A1 Jul. 2, 2015

(30) Foreign Application Priority Data

Dec. 27, 2013 (TW) ............................ 102148808 A

(51) Int. Cl.

| | |
|---|---|
| ***C08J 9/04*** | (2006.01) |
| ***C07G 1/00*** | (2011.01) |
| ***C08G 18/48*** | (2006.01) |
| ***C08H 7/00*** | (2011.01) |
| ***C08G 18/64*** | (2006.01) |
| ***C08G 18/76*** | (2006.01) |
| ***C08G 18/32*** | (2006.01) |
| ***C08L 71/02*** | (2006.01) |
| ***C08L 97/00*** | (2006.01) |
| ***C08J 9/00*** | (2006.01) |
| *C08G 101/00* | (2006.01) |

(52) U.S. Cl.

CPC ................. *C08J 9/04* (2013.01); *C07G 1/00* (2013.01); *C08G 18/3206* (2013.01); *C08G 18/4825* (2013.01); *C08G 18/6492* (2013.01); *C08G 18/7664* (2013.01); *C08H 6/00* (2013.01); *C08J 9/0061* (2013.01); *C08L 71/02* (2013.01); *C08L 97/005* (2013.01); *C08G 2101/00* (2013.01); *C08G 2101/0083* (2013.01); *C08J 2375/08* (2013.01); *C08J 2497/00* (2013.01)

(58) Field of Classification Search

CPC .. C07G 1/00; C08G 18/3206; C08G 18/4825; C08G 18/6492; C08G 18/7664; C08G 2101/00; C08G 2101/0083; C08H 6/00; C08J 9/0061; C08J 9/04; C08J 2375/08; C08J 2497/00; C08L 71/02; C08L 97/005

See application file for complete search history.

(56) References Cited

U.S. PATENT DOCUMENTS

| | | | | |
|---|---|---|---|---|
| 3,577,358 A * | 5/1971 | Santelli et al. | .... | C08G 18/6492 521/130 |
| 4,987,213 A | 1/1991 | Hirose et al. | | |
| 5,688,835 A | 11/1997 | Scherbel et al. | | |
| 2005/0014919 A1 | 1/2005 | Hatakeyama et al. | | |
| 2007/0254973 A1 | 11/2007 | Emge et al. | | |
| 2009/0069550 A1 | 3/2009 | Belanger | | |
| 2013/0233037 A1 | 9/2013 | Adam | | |

FOREIGN PATENT DOCUMENTS

| | | |
|---|---|---|
| CN | 102585141 | 7/2012 |
| CN | 102585143 | 7/2012 |
| CN | 102850507 | 1/2013 |
| DE | 19648724 | 5/1998 |
| FR | 2689366 | 10/1993 |
| TW | 201122010 | 7/2011 |
| WO | WO 99/51654 A1 | 10/1999 |
| WO | 2013179251 | 12/2013 |
| WO | WO 2014-044234 A1 | 3/2014 |

OTHER PUBLICATIONS

Rahman et al., "Biocomposites Based on Lignin and Plasticized poly(L-latic acid)," Journal of Applied Polymer Science, Jul. 2013, pp. 202-214.

"Office Action of Taiwan Counterpart Application", dated Jan. 19, 2015, p. 1-p. 10, in which the listed references were cited.

Jonathan Spender, et al., "Method for Production of Polymer and Carbon Nanofibers from Water-Soluble Polymers," Nano Letter, vol. 12, Jun. 2012, pp. 3857-3860.

Kjell Magne Askvik, et al., "Complexation between lignosulfonates and cationic surfactants and its influence on emulsion and foam stability," Colloids and Surfaces A: Physicochemical and Engineering Aspects, vol. 159, Issue 1, Nov. 30, 1999, pp. 89-01.

Hoyong Chung, et al, "Improved Lignin Polyurethane Properties with Lewis Acid Treatment," ACS Appl. Mater. Interfaces, vol. 4, May 2012, pp. 2840-2846.

Carolina Andreia Cateto, et al., "Optimization Study of Lignin Oxypropylation in View of the Preparation of Polyurethane Rigid Foams," Ind. Eng. Chem. Res., vol. 48, Feb. 2009, pp. 2583-2589.

Hamid Nadji, et al., "Oxypropylation of Lignins and Preparation of Rigid Polyurethane Foams from the Ensuing Polyols," Macromolecular Materials and Engineering, vol. 290, Issue 10, Oct. 20, 2005, pp. 1009-1016.

Xuejun Pan, et al., "Effect of replacing polyol by organosolv and kraft lignin on the property and structure of rigid polyurethane foam," Jan. 2013, Available at: http://www.biotechnologyforbiofuels.com/content/6/1/12.

(Continued)

*Primary Examiner* — John M Cooney

(74) *Attorney, Agent, or Firm* — Birch, Stewart, Kolasch & Birch, LLP

(57) ABSTRACT

A bio-polyol composition and a bio-polyurethane foam material are provided. By using the modifier and applying the dispersing and grinding process, the modified lignin is uniformly dispersed in the polyol solution and a bio-polyol composition is obtained. The obtained bio-polyol composition may be used to prepare the bio-polyurethane foam material with a high lignin content, a high compression strength and superior flame-resistance.

6 Claims, 3 Drawing Sheets

(56) References Cited

OTHER PUBLICATIONS

"Office Action of European Counterpart Application," dated May 13, 2015, p. 1-p. 7, in which the listed references were cited.
Chinese Office Action issued in Chinese Application No. 201410045316.2 dated Feb. 4, 2017.
Dai et al., "The Influence of Lignin Fibers on Compressive Properties of Reinforced Rigid Polyurethane Foam", J. of Nanjing Institute of Technology (Natural Science Edition) vol. 3, No. 2 (2005) pp. 22-26.
Hatakeyama et al., "Environmentally Compatible Hybrid-Type Polyurethane Foams Containing Saccharide and Lignin Componets", Macromol. Symp., vol. 224 (2005) pp. 219-226.
European Office Action issued in European Patent Application No. 14 199 141.4 dated Nov. 30, 2017.

* cited by examiner

BIO-POLYOL COMPOSITION AND BIO-POLYURETHANE FOAM MATERIAL

CROSS-REFERENCE TO RELATED APPLICATION

This application claims the priority benefits of Taiwan patent application No. 102148808, filed on Dec. 27, 2013. The entirety of the above-mentioned patent application is hereby incorporated by reference herein and made a part of this specification.

TECHNICAL FIELD

The present disclosure generally relates to a composition and a material thereof, in particular, to a bio-polyol composition and a bio-polyurethane foam material.

BACKGROUND

Owing to the inadequate supply risk of petroleum, the prices of petrochemicals keep rising. Moreover, during the production, the use and disposal of petrochemicals, a large number of pollutants are generated and many environmental problems occur. Therefore, the developments of plant-based raw bio-materials are strongly promoted, and they might replace the petrochemical raw materials as the important industrial raw materials in the future. In nature, the lignin resource is only lower than the cellulose. As there are about 50 billion tons worldwide production of the lignin per year, the abundant and low-cost lignin is an important raw material of great opportunities. In addition, the aromatic ring structure of the lignin attributes to good mechanical properties and chemical resistance, suitable as bio-composite materials.

However, the development of bio-composite materials using lignin in the polymer composite materials is still very limited, mainly due to the OH functional group and benzene ring structure of the lignin with strong intermolecular interaction such as hydrogen bonding and π-π attraction, which cause difficulty in the dispersion of the lignin in the polymer matrix. The more the added amount of the lignin, the worse mechanical properties the composite material.

If the lignin is mixed directly with the polyol for foaming, due to the poor dispersion and stability of the lignin in the polyurethane (PU), the more lignin is added the worse compressive strength is obtained. Although ion exchange may be used to modify lignin sulfonate, the treatment of ion exchange significantly increase the production costs.

SUMMARY

The present disclosure provides a bio-polyol composition comprising a polyol and a surface modified lignin. A surface of the surface modified lignin is coated or adsorbed with a modifier and the modifier is coated or adsorbed to the surface of the surface modified lignin via a physical bonding, and a particle size of the surface modified lignin ranges between 1-100 μm.

The present disclosure provides a bio-polyurethane foam material. The bio-polyurethane foam material has a content of a lignin of 0.1-50 wt % of a total weight of the bio-polyurethane foam material, and a particle size of the lignin ranges between 1-100 μm.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION

Figure 1:
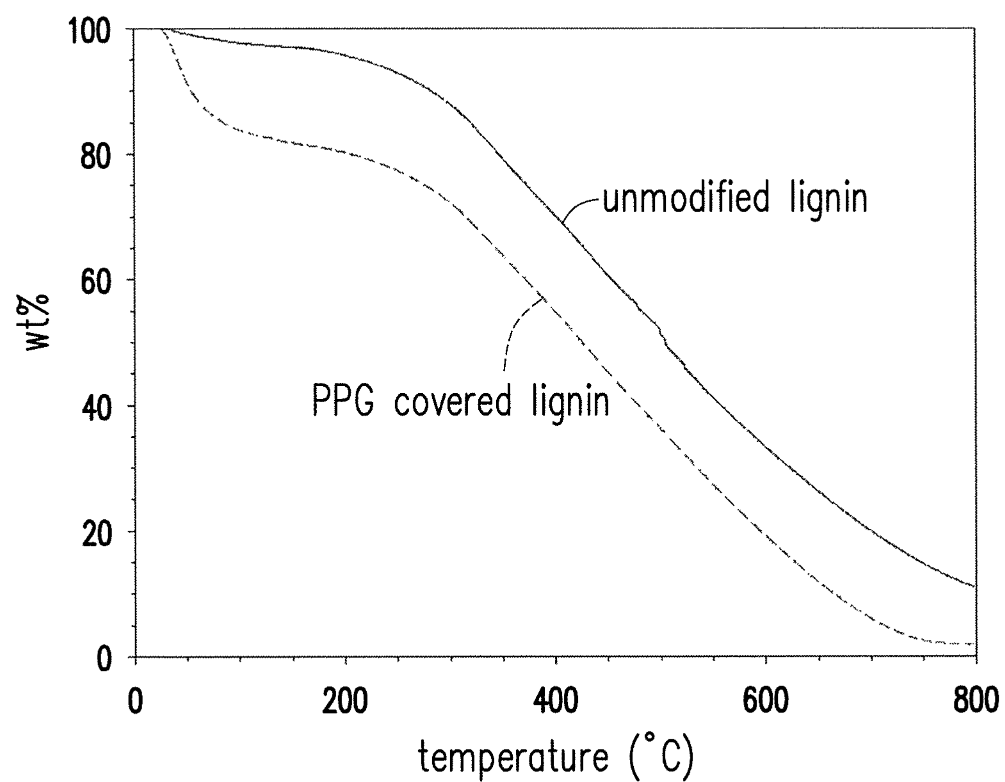
FIG. 1 shows the thermal gravimetric analysis spectrum of the unmodified pure lignin and the surface modified lignin.

Reference will now be made in detail to the present preferred embodiments of the disclosure, examples of which are illustrated in the accompanying drawings. Wherever possible, the same reference numbers are used in the drawings and the description to refer to the same or like parts.

A polyol is a compound with multiple hydroxyl functional groups available for organic reactions.

This disclosure provides a bio-polyol composition, a bio-polyurethane foam material and the manufacturing methods thereof. This disclosure provides a bio-polyol composition, comprising at least a polyol and a surface modified lignin, and the surface modified lignin can be uniformly dispersed in the polyol. When such bio-polyol composition is used to produce the polyurethane (PU) foam material, the surface modified lignin is uniformly dispersed in the PU foam material, thereby enhancing the mechanical properties and flame resistance of the PU foam material. This disclosure takes advantage of the solubility parameter selection to change the design and choices of the lignin(s) and the modifier(s), so that the solubility parameter of the modifier matches with that of the lignin. By using the lignin that is surface modified by the modifier (i.e., surface modified lignin), the compatibility and dispersibility of the surface modified lignin with the polyol are improved, the (surface modified) lignin is compatible with (or soluble in) the polyol, and a bio-polyol composition is obtained.

The aforementioned modifier may be an alcohol having at least a hydroxyl group or an epoxy group, an epoxy resin, or the mixture of the above-mentioned. For example, the polyol (polyhydric alcohol) may include ethylene glycol, polypropylene glycol (PPG), dipropylene glycol (DPG) or glycerol. Using the diols as examples, because both ends of the diol molecule have hydroxyl group (—OH), one end of the —OH group may be adsorbed onto the surface of the lignin to increase the dispersibility of the lignin (i.e., surface modified lignin), and the other end —OH group can further react to produce PU foam materials.

Solubility parameters of different types of lignins and diol modifiers, such as ethylene glycol, polypropylene glycol 400 (PPG400), are shown in Table 1. The compatibiltiy (inter-solubility) of the lignins and the modifiers correlate with the differences between the solubility of the lignins and the modifiers. For example, because the difference between the solubility parameter of lignin sulfonate and PPG400 is about 22.73 $J^{0.5}/cm^{1.5}$, the compatibiltiy of these two is poor, and the lignin becomes precipitated. On the other hand, because the difference between the solubility parameter of alkali lignin and PPG400 is smaller and is about 7.46 $J^{0.5}/cm^{1.5}$, the compatibility of these two is better and alkali lignin can be uniformly dispersed in PPG400. Similarly, because the difference between the solubility parameter of alkali lignin and ethylene glycol is about 13.7 $J^{0.5}/cm^{1.5}$, the compatibiltiy of these two is poor, and the lignin becomes precipitated. Contrarily, because the difference between the solubility parameter of lignin sulfonate and ethylene glycol is much smaller and is about 1.57 $J^{0.5}/cm^{1.5}$, the compatibility of these two is good and lignin sulfonate can be uniformly dispersed in ethylene glycol.

TABLE 1 lignin and polyol solubility parameter

| | Solubility parameter ($J^{0.5}/cm^{1.5}$) |
|---|---|
| Lignin sulfonate | 40.75 |
| Alkali lignin | 25.48 |
| ethylene glycol | 39.18 |
| PPG400 | 18.02 |

The foregoing lignin(s) may be lignin sulfonate, alkali lignin, or a mixture thereof, and the polyol(s) may be a diol, triol, tetraol, or a mixture thereof, including ethylene glycol, polypropylene glycol (PPG), dipropylene glycol (DPG), or glycerol, for example.

The surface-modified lignin can be modified by performing the dispersing and grinding process to the lignin and the modifier, so that the modifier is coated or adsorbed onto the surface of the lignin through physical bonding. With the appropriate dispersing and grinding process, the size of lignin can be reduced, and the polyol can be effectively coated on the surface of the lignin, thus reducing the surface energy of the lignin. The particle size of the surface modified lignin ranges between 1-100 μm, for example, between 10-60 μm, or between 10-30 μm. If the above-mentioned particle size is too large, the phase separation between lignin and polyol may easily occur. Contrarily, if the particle size is too small, the viscosity of polyol is too high, and the mixing of the lignin and isocyanate is inhomogeneous. The aforementioned dispersing and grinding process, may be a bead milling process, a ball milling process, or a combination thereof. The milling beads may be chosen from zirconium oxide beads, glass beads, or steel balls. The milling time may range between 5 to 240 minutes. If the milling time is too long, the particle size may be too small; on the contrary, if the milling time is too short, the particle size may be too large.

The surface modified lignin within the foregoing bio-polyol composition has a solubility parameter ranging between 15-45 $J^{0.5}/cm^{1.5}$, and a surface energy ranging between 25-70 $mJ/m^2$, the surface modified lignin accounts for 0.1-60 wt % of the total weight of the composition.

This disclosure also provides a bio-polyurethane foam material. The bio-polyurethane foam material includes 0.1-50 wt % of the (surface modified) lignin relative to the total weight of the bio-polyurethane foam material. The particle size of the (surface modified) lignin ranges between 1-100 μm, for example, between 10-60 μm, or between 10-30 μm. The bio-polyurethane foam material may be formed by mixing the aforementioned bio-polyol composition, a surfactant, a catalyst, a diisocyanate and a foaming agent for the foaming reaction, and then the mixture is solidified to form the bio-polyurethane foam material. Wherein the diisocyanate may comprise aliphatic diisocyanate, aromatic diisocyanate, or a mixture thereof. The surfactant may include a silicone compound. The catalyst may comprise a metal salt or an amine compound or a mixture thereof. The foaming agent may include methylene chloride, acetone, methyl ethyl ketone, n-hexane, or n-pentane.

In one embodiment, the process steps of the surface modification of the aforementioned lignin(s) and the foaming reaction of polyurethane (PU) may include performing the dispersing and grinding process with the modifier and the lignin to obtain a dispersion of the surface modified lignin that has been properly dispersed and ground, followed by mixing the polyol, the surfactant, and the catalyst, and then mixing the diisocyanate with the foaming agent for the foaming reaction, and finally solidifying the mixture into a PU foam material. The resultant bio-polyurethane foam material has a lignin content more than 16 wt %, a foaming ratio of 5-7 times, a compressive strength of up to 6.0 $kgf/cm^2$, a total heat release (THR) less than 16 $mJ/m^2$. The obtained bio-polyurethane foam material is a relatively superior polyurethane (PU) foam composite material with good compressive strength and flame resistance.

Example 1

After adding 48 grams of alkali lignin to 94 g of polypropylene glycol 400 (PPG400), dispersing using Lau dispersing and grinding machine for 30 minutes, 3 g of glycerol, 6 g dipropylene glycol (DPG), 1.8 g of the surfactant, 0.11 g of the catalyst and 1.6 g of water are added and mixed uniformly, and then 139 g of polymeric methylene diphenyl diisocyanate (PMDI) is added for foaming. The results are shown in Table 2.

Comparative Example 1

After dispersing 71 g of PPG400 using Lau dispersing and grinding machine for 30 minutes, 3 g of glycerol, 6 g of DPG, 1.8 g of the surfactant, 0.11 g of the catalyst and 0.55 g of water are added and uniformly mixed, and then 75.6 g of PMDI is added for foaming. The results are shown in Table 2.

Comparative Example 2

After dispersing 48 g of alkali lignin using Lau dispersing and grinding machine for 30 minutes, 97 g of glycerol, 6 g of DPG, 1.8 g of the surfactant, 0.11 g of the catalyst and 1.6 g of water are added and uniformly mixed, and then 75.6 g of PMDI is added for foaming. The results are shown in Table 2.

Comparative Example 3

After adding 48 g of alkali lignin to 94 g of PPG400, dispersing using a homogenizer for 30 minutes, 3 g of glycerol, 6 g of DPG, 1.8 g of the surfactant, 0.11 g of the catalyst and 0.55 g of water are added and uniformly mixed, and then 75.6 g of PMDI is added for foaming. The results are shown in Table 2.

Examples 2 and 3

The same practice and procedure as in Example 1, but the time for dispersing and grinding (milling time) is changed to 10 minutes and 20 minutes for Examples 2 and 3 respectively. The results are shown in Table 2.

Thermogravimetry analysis is performed to the lignin(s). The thermogravimetry analysis is to measure the weight changes of the material at a specific temperature range under a controlled pressure environment, which is mainly used to measure the thermal stability and its composition analysis of the material. FIG. 1 shows the thermal gravimetric analysis spectrum of the unmodified pure lignin (Comparative Example 2) and the surface modified lignin (Example 1). As seen in FIG. 1, for the lignin surface-coated with the polyol, no change was observed following the rising of temperature for the pyrolysis of the modified lignin, which indicates that the polyol is adsorbed or modified through physical bonding. The adsorption amount of the polyol on the surface of the lignin account for about 15 wt %, relative to the total weight of the lignin.

Figure 2:
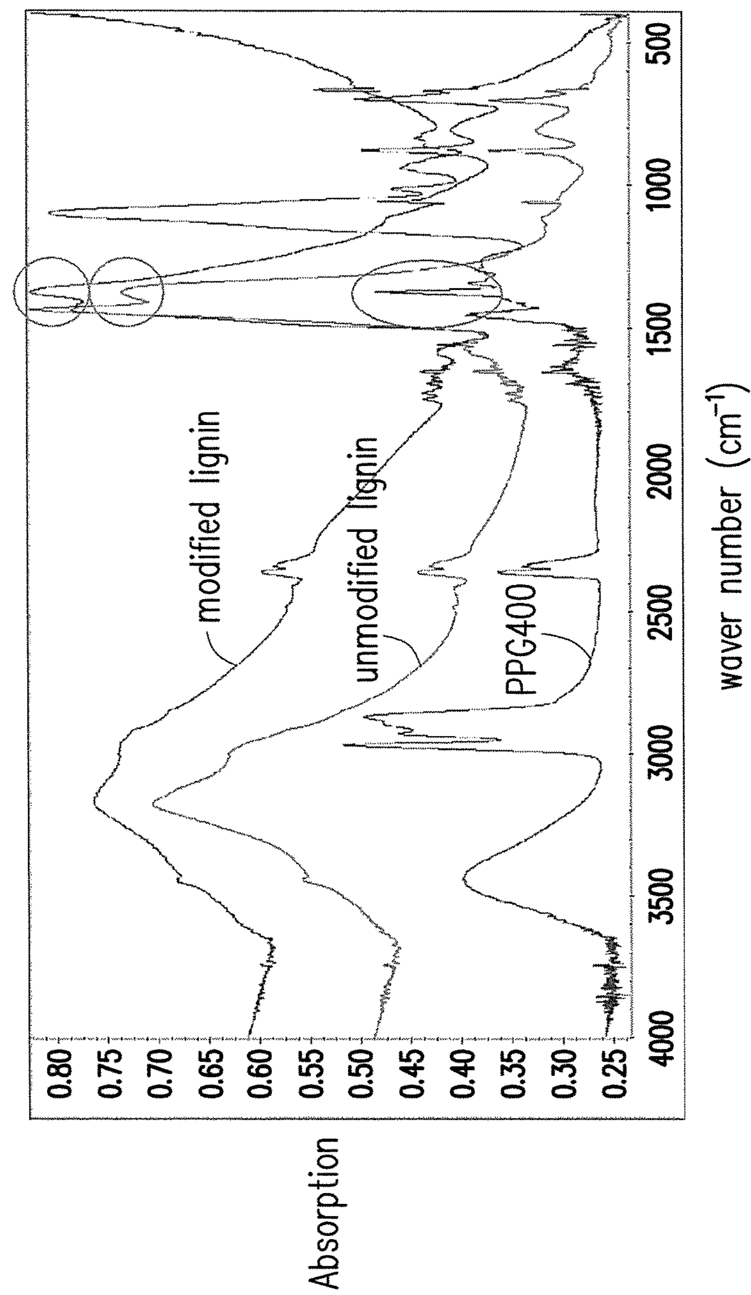
FIG. 2 shows the Fourier transform infrared (IR) spectrum of the unmodified lignin, the surface modified lignin and the modifier PPG400.

FIG. 2 shows the Fourier transform infrared (IR) spectrum of the unmodified lignin (Comparative Example 2), the surface modified lignin (Example 1) and the modifier PPG400. The common range of the infrared wave number for the IR spectrum ranges 400-4000 $cm^{-1}$. Specific functional groups can be observed from the related peak positions in the infrared spectrum. Compared to the unmodified lignin, for the surface modified lignin, the absorption intensity of the peak at 1350 $cm^{-1}$ of the surface modified lignin increases but the absorption intensity of the peak at 1450 $cm^{-1}$ declines in the IR spectrum. Compared with the absorption intensity of the peaks at 1350 $cm^{-1}$ and 1450 $cm^{-1}$ of the control group PPG400 in spectrum, it is determined that the surface of the lignin is coated with PPG400.

Figure 3:
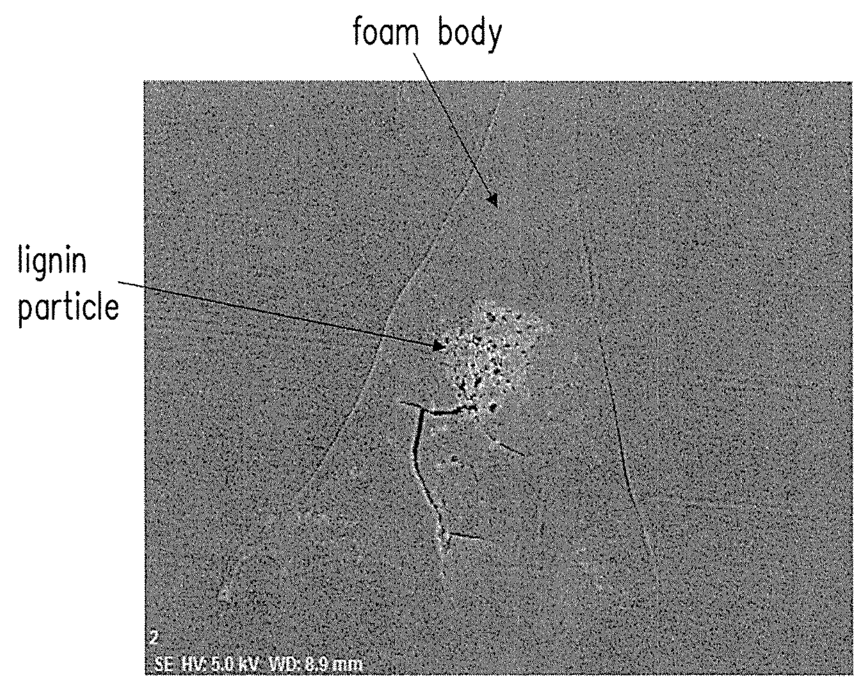
FIG. 3 shows the scanning electron microscope picture of the lignin PU foam material.

FIG. 3 shows the scanning electron microscope picture of the PU foam material of Example 1. It is shown that the lignin is dispersed as particles within the PU foam material.

TABLE 2

| | lignin | modifier (PPG400) | Polyol | PMDI | milling time | compressive strength (kgf/cm$^2$) | Note |
|---|---|---|---|---|---|---|---|
| Example 1 | 48 | 94 | 9 | 139 | 30 minutes | 6.00 | |
| Comparative Example 1 | | 71 | 9 | 75.6 | 30 minutes | 5.28 | pure petrochemical raw material |
| Comparative Example 2 | 48 | | 103 | 139 | 30 minutes | 2.10 | unmodified lignin |
| Comparative Example 3 | 48 | 94 | 9 | 139 | — | 3.28 | dispersed by homogenizer |
| Example 2 | 48 | 94 | 9 | 139 | 10 minutes | 4.71 | |
| Example 3 | 48 | 94 | 9 | 139 | 20 minutes | 5.17 | |

Table 2 shows the property analysis of the PU foam material obtained by using different lignins (surface modified and unmodified lignins) with different milling time. As shown in Table 2, the PU foam material obtained by using the pure petrochemical raw material has a compressive strength of about 5.28 kgf/cm$^2$ (Comparative Example 1). The particle size of the lignin(s) can be controlled thorough the length of the milling time. For different milling time, the particle size of the lignin may be changed from 45.8 μm (milled for 10 minutes) to 21.7 μm (milled for 30 minutes). When the particle size of the lignin is reduced to 21.7 μm, the obtained PU foam material has a compressive strength of 6 kgf/cm$^2$, which is satisfactory and 13.6% higher than the compressive strength of the PU foam material of the pure petrochemical material.

Table 3 shows the particle size ranges and surface energy of the lignins in various Examples.

TABLE 3

| | particle size (μm) | surface energy(mJ/m$^2$) | Surface energy difference relative to PPG400* (mJ/m$^2$) |
|---|---|---|---|
| Alkali lignin | 150~200 | 67.1 | 39.7 |
| Example 2 | 45.80 | 46.3 | 18.9 |
| Example 1 | 21.66 | 39.2 | 11.8 |

*Note:
The surface energy of PPG400 is 27.4 mJ/m$^2$

As shown in Table 3, by using the dispersing and grinding process, the particle size of the lignin(s) can be reduced and the polyol efficiently covers the lignin surface, thus reducing the surface energy of the lignin effectively. From Example 1, it is learned that when the surface modified lignin and modifier PPG400 have similar surface energy (surface energy difference is small), the lignin can be uniformly dispersed in the polyol. From Example 2, it is learned that when the surface energy difference of the lignin and the modifier PPG400 is large, the sedimentation of the lignin occurs (i.e., the lignin is incompatible with the polyol).

Figure 4:
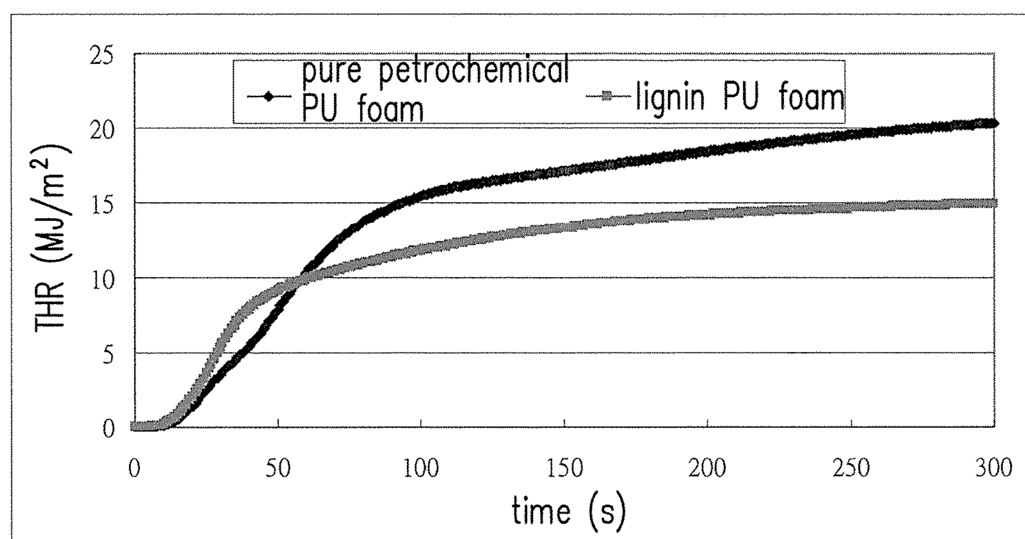
FIG. 4 illustrates the comparison of the total heat release (THR) amount of the lignin PU foam material of obtained by using the surface modified lignin and the PU foam material of pure petrochemical raw material.

FIG. 4 illustrates the comparison of the total heat release (THR) amount of the lignin PU foam material of obtained by using the surface modified lignin and the PU foam material of pure petrochemical raw material.

Table 4 shows the property analysis of the lignin PU foam material obtained by using the surface modified lignin and the PU foam material of pure petrochemical raw material.

TABLE 4

| | Lignin content (%) | foaming ratio | compressive strength (kgf/cm$^2$) | THR (mJ/m$^2$) |
|---|---|---|---|---|
| Example 1 | 17 | 8.47 | 6.00 | 14.95 |
| Comparative Example 1 | 0 | 8.74 | 5.28 | 20.34 |

From FIG. 4 and the results of Table 4, the PU foam material of pure petrochemical raw material has the total heat release (THR) amount reached 20.34 mJ/$m^2$, while the lignin PU foam material obtained by using the surface modified lignin has the total heat release (THR) amount declined sharply to 14.95 mJ/$m^2$, about 26.5% lower, which means improved flame resistance. If comparing these two PU foam materials, the lignin PU foam material obtained by using the surface modified lignin has a similar foaming ratio but a better compressive strength. From the above results, through screening the solubility parameter or the surface energy of the lignin(s) and the modifier(s) to choose the compatible lignin(s), modifier(s) and polyol(s), and using the dispersing and grinding process, one or more lignin PU foam materials with mechanical properties and flame resistance, which are comparable to those of the pure petrochemical PU foam material, can be obtained.

This disclosure chooses the compatible modifiers, lignins and polyols based on the solubility parameter and the surface energy thereof. Also, because the manufacturing processes of this disclosure utilize the dispersing and grinding process, instead of the conventional way of modifying the lignin through ion exchange, the modified lignin is highly compatible with the polymer, thereby increasing the addition amount of the lignin in the PU foam composite material and maintaining the compressive strength of the PU foam composite material. Since the lignin is modified without using ion exchange and the addition amount of the lignin is increased, the cost of the polyurethane foam composite material may be reduced by adding more lignins, and the high-quality physical properties of the polyurethane foam composite material can be maintained.

Although the lignins are described in the present embodiments as examples, it is possible to use other raw materials, including, cellulose, hemicellulose or starch.

The disclosed bio-polyol composition may be applied to produce not only the PU resins or PU foam materials, but also epoxy resins, polyester resins, unsaturated polyesters, phenolic resins, or phenolic foam materials.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims and their equivalents.

What is claimed is:

1. A bio-polyurethane foam material, wherein the bio-polyurethane foam material has a content of a surface modified lignin of 0.1-50 wt % of a total weight of the bio-polyurethane foam material, and a particle size of the surface modified lignin ranges between 10-60 μm, wherein the surface modified lignin comprises a modifier which is coated or adsorbed onto a surface of the lignin via physical bonding, wherein the surface modified lignin is obtained by mixing a lignin and the modifier and performing a dispersing and grinding process to cover the modifier on a surface of the lignin, and wherein the modifier is selected from the group consisting of an alcohol having a hydroxyl group, an alcohol having an epoxy group, an epoxy resin, and a mixture thereof, wherein the dispersing and grinding process comprises a bead milling process, a ball milling process, or a combination thereof, and wherein the surface modified lignin is selected from the group consisting of lignin sulfonate, alkali lignin and a mixture thereof.

2. A bio-polyurethane foam material, which is obtained by mixing a polyol, a surface modified lignin, a surfactant, a catalyst, a diisocyanate, and a foaming agent for a foaming reaction, and then solidifying the mixture, wherein the surface modified lignin comprises a modifier which is coated or adsorbed onto a surface of the lignin via physical bonding, wherein the surface modified lignin is obtained by mixing a lignin and the modifier and performing a dispersing and grinding process to cover the modifier on a surface of the lignin, and wherein the modifier is selected from the group consisting of an alcohol having a hydroxyl group, an alcohol having an epoxy group, an epoxy resin, and a mixture thereof, wherein the dispersing and grinding process comprises a bead milling process, a ball milling process, or a combination thereof, wherein the bio-polyurethane foam material has a content of surface modified lignin of 0.1-50 wt % of a total weight of the bio-polyurethane foam material, wherein a particle size of the surface modified lignin ranges between 10-60 μm, and wherein the surface modified lignin is selected from the group consisting of lignin sulfonate, alkali lignin and a mixture thereof.

3. The material of claim 2, wherein the diisocyanate comprises an aliphatic diisocyanate, aromatic diisocyanate, or a mixture thereof.

4. The material of claim 2, wherein the surfactant includes a silicone compound.

5. The material of claim 2, wherein the catalyst comprises a metal salt, an amine compound, or a mixture thereof.

6. The material of claim 2, wherein the foaming agent includes methylene chloride, acetone, methyl ethyl ketone, n-hexane, or n-pentane.

* * * * *